United States Patent
Tahernezhaadi et al.

(10) Patent No.: US 6,839,427 B2
(45) Date of Patent: Jan. 4, 2005

(54) METHOD AND APPARATUS FOR ECHO CANCELLER AUTOMATIC GAIN CONTROL

(75) Inventors: Mansour Tahernezhaadi, Naperville, IL (US); Michael J. Kirk, Mount Prospect, IL (US)

(73) Assignee: Motorola, Inc., Schaumburg, IL (US)

( * ) Notice: Subject to any disclaimer, the term of this patent is extended or adjusted under 35 U.S.C. 154(b) by 138 days.

(21) Appl. No.: 10/027,140

(22) Filed: Dec. 20, 2001

(65) Prior Publication Data

US 2003/0117967 A1 Jun. 26, 2003

(51) Int. Cl.$^7$ ................................................ H04M 9/08
(52) U.S. Cl. ........................ 379/406.01; 379/406.02; 379/406.03; 379/406.04; 379/406.06; 379/406.07; 379/406.08; 379/406.09; 379/406.11; 379/406.14
(58) Field of Search .................. 379/406.01, 406.16

(56) References Cited

U.S. PATENT DOCUMENTS

| | | | | |
|---|---|---|---|---|
| 5,313,498 A | * | 5/1994 | Sano | 379/406.01 |
| 5,463,618 A | * | 10/1995 | Furukawa et al. | 379/406.01 |
| 5,559,793 A | * | 9/1996 | Maitra et al. | 379/406.01 |
| 5,612,996 A | * | 3/1997 | Li | 379/406.01 |
| 5,631,899 A | * | 5/1997 | Duttweiler | 379/406.01 |
| 6,108,412 A | * | 8/2000 | Liu et al. | 379/406.07 |
| 2002/0076037 A1 | * | 6/2002 | Nishimura et al. | 379/406.01 |

* cited by examiner

Primary Examiner—Forester W. Isen
Assistant Examiner—Ramnandan Singh
(74) Attorney, Agent, or Firm—Marshall, Gerstein & Borun LLP

(57) ABSTRACT

A method and apparatus that performs specific automatic gain control in an echo canceller (16). The disclosed method and apparatus utilize a low complexity algorithm that performs automatic gain control to achieve greater speed of convergence of the echo canceller (16) and an increased ability to distinguish between near-end speech and echo through the use of specific automatic gain control. A double talk threshold of the echo canceller is adjusted by using, in part, computed gains of inbound and outbound signals internally within the echo canceller in order to adjust the echo canceller double talk threshold.

12 Claims, 4 Drawing Sheets

METHOD AND APPARATUS FOR ECHO CANCELLER AUTOMATIC GAIN CONTROL

FIELD OF THE INVENTION

The present invention relates generally to communication systems, and more particularly, to a method and apparatus that performs specific automatic gain control for an echo canceller within the communications system.

BACKGROUND OF THE INVENTION

In most communication systems, there are what are termed "near-end" and "far-end" with a respective communicator, the nomenclature of the portion being dependent on the communicator's point of reference. In telephone wire transmission communication systems, in particular, there are typically two-wire connections from the individual wire line subscribers to a central switching telephone office, such as in a public switch telephone network (PSTN). The transmission of signals between switching offices is typically effected over four-wire circuits. Thus, at the different switching offices, the communication signals are converted between the two and four-wire circuits by what are termed "hybrid" circuits. Impedance mismatch in a hybrid circuit gives rise to reflection of a four-wire receive path signal onto the four-wire send path. If enough delay is present in the telephone network, this reflected signal presents itself as echo to the communicator who originated the speech signal at the far-end due to the impedance mismatch of the hybrid circuit at the near-end. Short delays experience between communicators (on the order of one to 20 milliseconds) typically do not present an impediment to the efficient exchange of spoken words. Longer delay, however, may result in syllables and even entire words being repeated as an echo and may render the communication channel unuseable.

Other sources of echo in communication systems, include acoustic echo, which is a result of microphone and speaker coupling. For example, in mobile handsets, as well as hands-free units, echo is caused by reflected far-end voice transmissions that are coupled to the near-end communication terminal's microphone section via the near-end terminal's speaker. Such acoustic echo greatly undermines voice quality in mobile units and hands-free units.

A solution to the echo problem has been to provide echo cancellation to prevent delayed or reflected far-end signal by canceling these signals. In general, an echo canceller operates by determining the transmission response of a transmission path to an impulse input over time. The echo canceller calculates an expected echo signal by applying a signal that is received from the far-end communicator (also referred to as reference speech or reference signal x(n)) to the characterized impulse response. The received synthetic echo produced by the echo canceller is then subtracted from the received echo, thereby canceling echo produced by equipment located at the near-end.

Echo cancellers, however, cannot ordinarily cancel all of the unwanted signals on a channel. Thus, echo canceling systems also employ a center clipping echo suppressor to suppress any residual echo on the channel that is not cancelled by the echo canceller. The center clipper is a level-activated switch used to completely remove any pure residual echo in response to a center clipper flag "cclip" being asserted to an ON state.

Another feature of conventional echo cancellers is the use of double-talk detection, which senses when both the near-end and far-end communicators are speaking at the same time (ie., full-duplex speech). Because full-duplex communication is desirable, the double-talk detector is sometimes used to control the operation of the center clipping echo suppressor by halting center clipping when the difference between the energy of the reference signal x(n) and the energy of a "desired" signal, which is input to the echo canceller, is less than a double-talk threshold, which is an indication of the presence of near-end speech. Otherwise, if the echo canceller was allowed to perform adaptation while both communicators are talking, an "error" signal e(n) output from the echo canceller would become very large and the impulse response model would be erroneously adjusted (i.e., divergence of the echo canceller).

Other conventional echo cancellers do not include a further gain control to enhance the echo cancellation capabilities of the echo canceller. This is due to the observation that a large disparity between the desired signal energy and the reference signal energy may lead to poor echo cancellation capabilities for an echo canceller. This is especially true for acoustic echo whose power is close to the reference signal power. Conventional automatic gain control schemes are designed to alter the inbound and outbound gains for signals into and out of the echo canceller without any regard to the internal processing of the echo cancellers itself. It has been observed by the applicants that such conventional echo canceller employing automatic gain control that is not specific to the echo canceller itself exhibit degraded echo cancellation performance when applying the automatic gain control.

DETAILED DESCRIPTION OF THE PREFERRED EMBODIMENTS

The apparatus and methods disclosed in accordance with the teachings of the present invention include a low complexity algorithm to perform automatic gain control for echo cancellation. More particularly, the echo cancellation system in accordance with the teachings of the present invention includes an automatic gain control (AGC) scheme that features echo cancellation by ameliorating power disparity between the reference and desired signals as seen internally by the echo canceller unit. Operation modes include the options of computing gains only for internal use by the echo canceller for the underlying purpose of echo cancellation. Another mode of operation may include computing gains both for internal echo cancellation within the echo canceller and for applying the computed gains also to inbound and outbound signals. Furthermore, the presently disclosed apparatus and method allows for a mode of operation where gains are used to only adjust the outbound and inbound signal levels as is done in the conventional art.

An apparatus and a method constructed according to the teachings of the present invention affect computation of inbound (i.e., the reference signal) and the outbound (i.e., the desired signal) signal gains when predetermined conditions are satisfied. When these predetermined conditions are satisfied, a low complexity algorithm is executed to compute the inbound and outbound gains. Upon completion of the computations of the gains, the above-mentioned three modes of operation may be executed. In Mode 1, the gains are used internally only to adjust the echo canceller double-talk threshold for purposes of the echo canceller adaptation along with adjustment of the level of the near-end signal in order to distinguish between the near-end and echo signal for the purpose of comfort noise insertion. In Mode 2, the computed gains are also applied to adjust the levels of the inbound and outbound signals as well as performing the functions of Mode 1. Finally, as described above, Mode 3 simply applies the computed gains to the outbound and inbound signals as is done in the conventional art. Moreover, the gains are computed such that the peak reference and peak desired signal power reach a predetermined target power level, such as −18 dBmO. An added capability of the present automatic gain control scheme according to the teachings of the disclosure is that it can be configured for bi-directional echo cancellation and, if Modes 1 or 2 are executed, the apparatus and method according to the teachings of the present invention are capable of canceling severe echo cases where the echo power is close to or higher than the reference signalpower.

Figure 1:
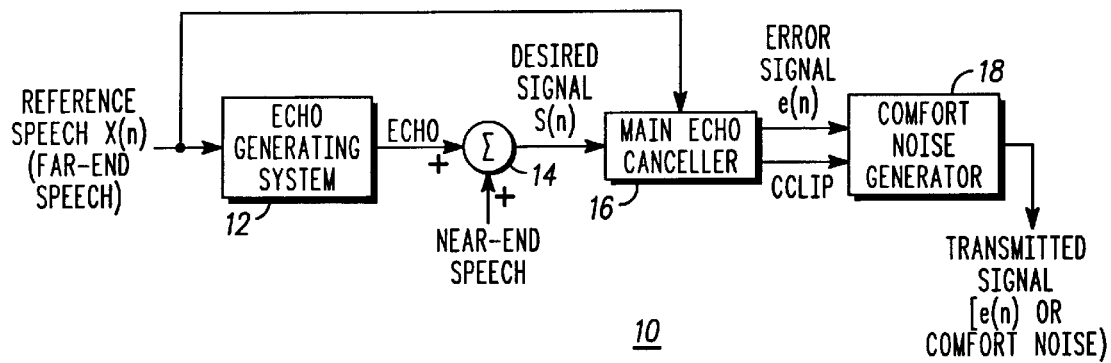
FIG. 1 illustrates a block diagram of a communication system employing echo cancellation according to the teachings of the present invention.

FIG. 1 illustrates a portion of a communication system employing a echo canceller shown generally at 10. This portion of the communication system shown receives a reference speech signal x(n), which represents the far-end speech received from a far-end communicator. The inherent characteristics of the near-end portion of the communication system, which present echo, are shown representatively as the echo generating system 12. Thus, the output resultant of the echo generating system 12 is termed echo and is added to any near-end speech that is present in the system, as represented by summing junction 14. The combination of the echo and near-end speech is termed the "desired" signal s(n). This desired signal s(n) is input through a main echo canceller 16, which serves to cancel any echo present in the desired signal by subtracting out the estimated echo that is produced by an adaptive filter within the main echo canceller 16. In order to estimate the echo that may be presented by the echo generating system 12, the reference speech signal x(n) is input to the main echo canceller 16 so that the logic of the adaptive filter may adaptively estimate echo using a mathematical algorithm, such as a Least Means Square algorithm, for example.

The output of the main echo canceller is termed the "error" signal e(n). The main echo canceller 16 also generates a center clipper flag cclip having two states ON or OFF that selectively control the insertion of comfort noise by a comfort noise generator 18 in place of the error signal e(n) as the transmitted signal.

Figure 2:
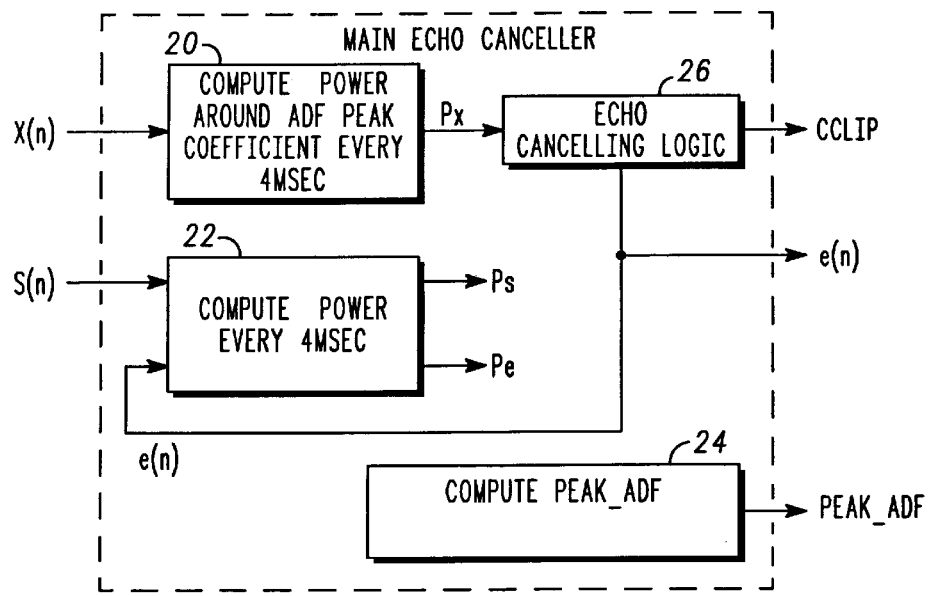
FIG. 2 illustrates a block diagram of the main echo canceller from the system of FIG. 1 illustrating the internal computations of power for the echo cancellation according to the teachings of the present inventions.

Within the main echo canceller 16 are a number of components that may be implemented either through hardware or software. FIG. 2 illustrates some of these components as blocks within the main echo canceller 16. A logic 20 is utilized to compute the power around the adaptive filter (ADF) peak coefficient every four milliseconds, for example. The power of the reference signal x(n) is output from the logic block 20 and is labeled P(x). This computed power is input to the logic 26 that is used to control the actual echo canceling operation within the main echo canceller 16. Additionally, logic block 22 is used to compute the power of the desired signal s(n) and the error signal e(n) from within the echo canceller every four milliseconds, for example. These output powers $P\_s$ and $P\_e$ are input to the echo canceling logic 26 for use in the echo canceling routine. Additionally, the peak coefficient of the adaptive filter labeled peak_ADF is computed by logic block 24. This peak adaptive filter coefficient is computed by finding the maximum absolute value of the adaptive filter coefficient. Considering a sampling rate of 8,000 kHz, the number of samples in the 4 millisecond computation time period would be 32. This number, however, maybe set to any predetermined amount that is optimal for execution of the algorithm. As is shown, the peak coefficient is delivered to logic block 20 to enable computation of the reference power around this ADF peak coefficient.

Figure 3:
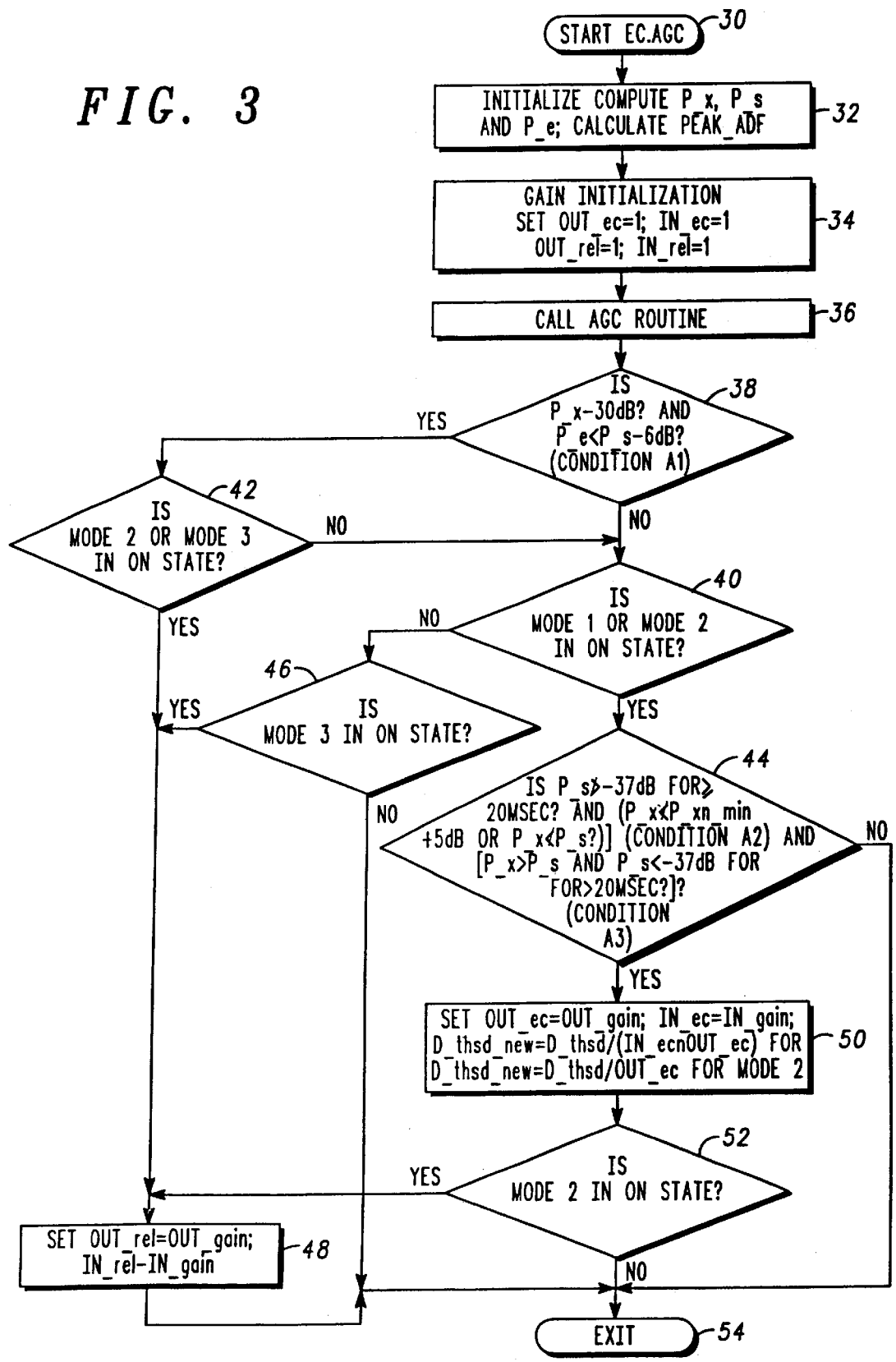
FIGS. 3–5 illustrate a flow diagram of the methodology for echo cancellation in accordance with the teachings of the present invention.

FIG. 3 illustrates the algorithm effected by the echo canceling logic 26 in accordance with the teachings of the present invention for automatic gain control in an echo canceling operation. The algorithm starts at step 30 and proceeds directly to step 32 for initialization. Here the powers of the reference signal x(n), the desired signal s(n) and the error signal e(n) (i.e., $P\_x$, $P\_s$ and $P\_e$) are calculated as well as the peak coefficient of the adaptive filter (i.e., peak_ADF). It is noted that the average power of the reference signal $P\_x$ is computed every 4 milliseconds using a rectangular window that corresponds to the time of the echo. That is, the average power of the reference signal $P\_x$ is echo-delay adjusted. That is, given an estimate of echo delay, which corresponds to the location of the ADF peak coefficient, the computation looks back for a time corresponding to the echo delay and computes the reference energy associated with that time. After computation of the variables in step 32, flow proceeds to step 34 where the particular values for different gains are initialized. Specifically, a gain that is to be computed for the desired signal s(n) that is used only for echo cancellation purposes is initialized to a value of 1 and is labeled out_ec. Similarly, a reference signal gain that is to be computed only for echo cancellation purposes is initialized to a value of 1 and is labeled in_ec. Also, a desired signal gain that is to be only for the desired signal release path is initialized to a value of 1 and termed out_rel. Similarly, a reference signal gain that is to be applied only to the reference signal release path is initialized to a value of 1 and labeled in_rel.

Flow then proceeds to the AGC routine, which will be described later with respect to FIGS. 4 and 5, calculates values for the variables in_gain and out_gain. These variables are, respectively, gains computed for the reference signal and the desired signal and are utilized by the remainder of the algorithm illustrated in FIG. 3.

After the AGC routine returns computed gains for the variables in_gain and out_gain, flow proceeds to step 38 for the execution of a first condition A1. Here the algorithm checks to determine if the echo canceller is performing adequately in terms of echo cancellation achieved as measured by the presence of a strong reference signal power $P\_x$. For example, a determination is made to check whether the reference signal power $P\_x$ is greater than −30 dBmO, which may be used to measure the presence of a strong reference signal, but this threshold is merely exemplary. In addition to checking for a strong reference signal, step 38 also requires that the error power $P\_e$ is less than the desired signal power $P\_s$ by a predetermined threshold (typically 6 db). If both of the conditions shown in step 38 can be answered in the affirmative, flow proceeds to step 40, otherwise flow is directed to step 42. In particular, if the conditions of step 38 are true, thereby indicating that the main echo canceller is performing adequately in terms of residual echo power, then echo canceller specific automatic gain control does not need to be performed. Hence, at step 42 the algorithm checks whether Modes 2 or 3 are specified or, in other words, are in the ON state. If not, flow proceeds to step 40 to determine if Mode 1 has been selected.

Alternatively, at step 38, if the conditions are not met, flow also proceeds to step 40 to determine if Mode 1 or Mode 2 have been selected. If at step 40 a determination is made that either Mode 1 or Mode 2 is in the ON state, flow proceeds to step 44. Otherwise, flow proceeds from step 40 to step 46 where a determination as to whether Mode 3 is in the on state is made.

At step 42, if neither Mode 2 nor Mode 3 is in the ON state, flow proceeds to step 46 where flags out_rel and in_rel are set to the values of out_gain and in_gain, respectively. The flag out_rel is the computed desired gain that is applied only to the desired signal released path. The gain in_rel is the computed reference signal gain applied only to the reference signal released path. Additionally, if Mode 3 is in the ON state as determined at step 46 flow also proceeds to step 48.

In step 44, the algorithm checks to determine if two conditions, conditions A2 and A3, are respectively false and true. The first of these conditions, condition A2, checks to see if the desired signal has been active prior to the reference signal for a predetermined duration. This condition is determined by checking if the desired signal power P_s exceeds a specified threshold (typically −37 dBmO) for a specified time duration (typically 20 milliseconds). Additionally, condition A2 checks to see if either the reference signal power P_x is below a floor level termed P_xn_min plus a specified threshold (typically 5 dB) or if the reference power P_x is less than the desired signal power P_s. If condition A2 is true, it is likely that the desired signal s(n) is not the echo of the reference signal x(n).

Also in step 44 a condition A3 is checked to see if it is true. Specifically, this condition checks to determine if the desired signal has not been active prior to the reference signal as measured by the reference signal power P_x being greater than the desired signal power P_s. Additionally, condition A3 also requires that the desired signal to not have been active prior to the reference signal as measured by the desired signal power P_s being less than a predetermined threshold (typically −37 dBmO) for a specified duration of time (typically greater than 20 milliseconds). If this condition is True it is likely that the desired signal s(n) is the echo of the reference signal x(n).

Hence, if condition A2 of step 44 is False and condition A3 of step 44 is True, flow proceeds to step 50 where the computed inbound and outbound gains supplied by the AGC routine are assigned to the variables out_ec and in_ec, which are the computed gains to be applied only for echo cancellation purposes Specifically, the variable out_ec is the computed desired signal gain applied only for echo cancellation purposes. Similarly, the variable in_ec is the computed reference signal gain applied for only echo cancellation. Additionally, at step 50 a new double-talk threshold d_thsd_new is computed by dividing the double-talk threshold d_thsd from the main echo canceller algorithm and by the product of the computed reference signal gain e_ec and the computed desired signal gain out_ec for Mode 1 operation. Additionally for Mode 2 operations, the new double-talk threshold d_thsd_new is computed by dividing the double-talk threshold d_thsd from the main echo canceller algorithm by the computed desired signal gain out_ec. After the assignments made in step 50 are accomplished, flow proceeds to step 52 where the algorithm determines whether Mode 2 is in the ON state. If step 52 is answered in the affirmative, flow proceeds to step 48 so that the computed desired signal gain and reference signal gain may be set equal to the gains computed by the AGC routine, since Mode 2 requires the additional function of applying gains to the desired signal and reference signal paths. If, at step 52, Mode 2 is not in the ON state, flow proceeds directly to the exit (step 54) of the routine.

If the steps 40 and 46 are both answered in the negative, thereby indicating none of Mode 1, Mode 2 or Mode 3 is selected, flow simply proceeds to the exit (step 54) of the algorithm because no automatic gain control is desired.

Figure 4:
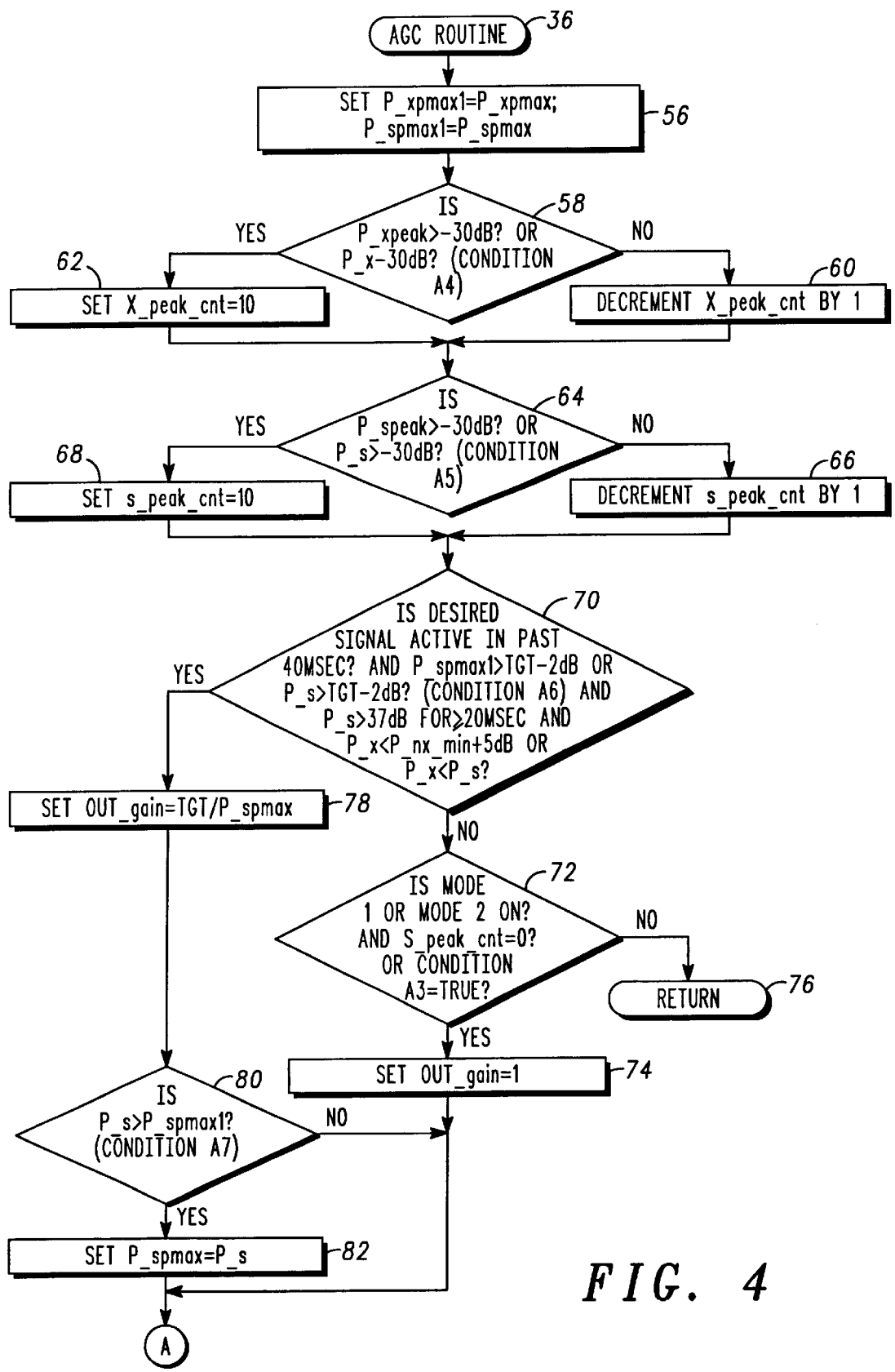
Figure 5:
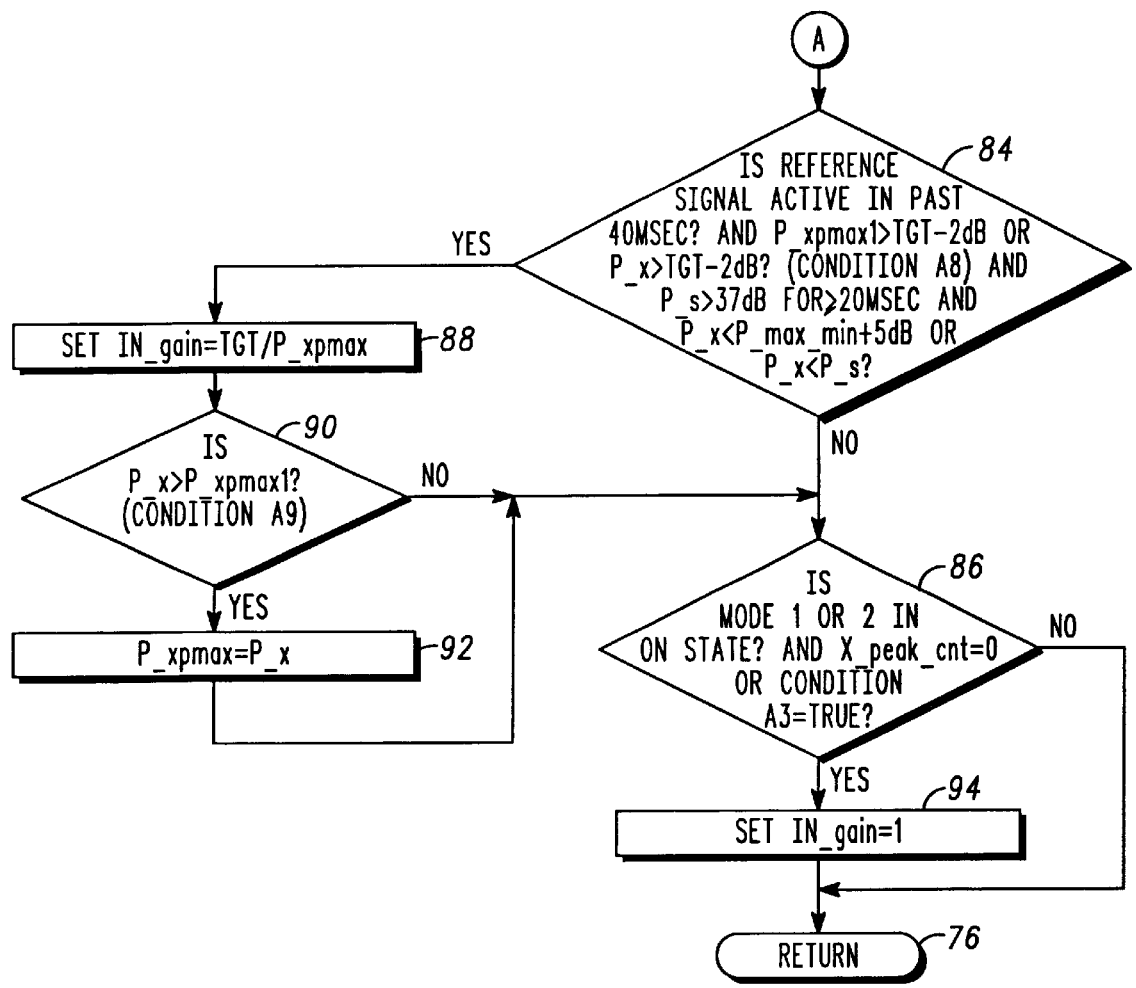

In FIGS. 4 and 5 the AGC routine that is called at step 36 in the procedure of FIG. 3 is illustrated. After call of the AGC routine at step 36, the flow proceeds to step 56 in FIG. 4 for initialization of the short term peak power of the reference signal p_xpmax1 and the short term peak power of the desired signal p_spmax1 to the values of an intermediate variable tracking short term peak power of the reference signal p_xpmax and an intermediate variable tracking short term peak power of the desired signal p_spmax, respectively. Next, the flow proceeds to step 58 to check condition A4. Specifically, this condition checks to determine whether the long term peak power of the reference signal p_xpeak is greater than a specified threshold (typically −30 dBmO) or the reference power p_x exceeds a predetermined threshold (typically −30 dB). This condition is required to track the peak level of the reference signal in order to compute gain based on a sustained peak signal value and not on a short-lived peak value. If either of the relationships of condition A4 are met, flow proceeds to step 62 where the counter x_peak_cnt is forced to a value of 10 (i.e., 40 milliseconds given a 4 millisecond running time for each iteration of the algorithm). Flow then proceeds to step 64 for the execution of condition A5. If, on the other hand, condition A4 as checked at step 58 is not True, flow proceeds to step 60 where the counter x_peak_cnt is decremented by a value of 1. Afterwards, flow proceeds to step 64.

In step 64 condition A5 is tested. Here, this condition is similar to condition A4 checked in step 58 with the exception that it is tracking the desired signal peak power instead of the reference signal peak power. Accordingly, the long term peak power of the desired signal p_speak and the power of the desired signal P_s are compared against a specified threshold (typically −30 dBmO). If condition A5 is met, flow proceeds to step 68 where the counter s_peak_cnt is forced to a value of 10 and flow proceeds then to step 70. If condition A5 is not met, flow proceeds to step 66 where the counter s_peak_cnt is decremented by 1. Flow then proceeds to step 70.

At step 70, conditions A6 and the criteria for previously described condition A2 are checked to see if both conditions A6 and A2 are True. With respect to condition A6, the algorithm first determines if the desired signal s(n) was active in the past 40 milliseconds. Additionally, condition A6 requires that either an intermediate variable tracking short term peak power of the desired signal p_spmax or the power of the desired signal P_s are greater than a target TGT less a specified amount (typically −2 dB). The specified target level TGT is preferably set to a value of −18 dBmO. Additionally, at step 70 the converse of condition A2 shown in step 44 must be met in order for a True condition to be present. That is, the desired signal power P_s must be greater than −37 dBmO for 20 milliseconds or more and the power of the reference signal P_x must be less than a floor level for the reference signal p_xn_min plus a specified amount (typically 5 dB) or the power of the reference signal P_x must be less than the power of the desired signal P_s.

If the conditions of step 70 are met in the affirmative, flow proceeds to step 78 where the gain computed for the desired signal out_gain is set equal to the target value TGT divided by the short term peak power of the desired signal p_spmax. It is noted that the conditions of step 70 allow for this computation of the desired gain in step 78 only when the desired signal s(n) is not considered an echo signal and is operating close to or above a specified target level (TGT).

If the requisite conditions of step 70 are not met, flow proceeds to step 72 where the algorithm checks if Mode 1 or 2 is in the ON state and if at least one of the desired signal peak count s_peak cnt is equal to zero or condition A3, as was described with respect to step 44 in FIG. 3, is True. When the desired signal peak counter is equal to zero, this indicates that the desired signal s(n) has not been active in the past 40 milliseconds. If the conditions of step 72 are met, then flow proceeds to a return step 76, which returns flow to the call step 36 in FIG. 3.

After step 78, flow proceeds to step 80 where condition A7 is checked. Specifically, condition A7 determines whether the desired signal power P_s is greater than the short term peak power of the desired signal p_spmax1. If yes, the intermediate variable tracking short term peak power p_spmax is set equal to the value of the desired signal power P_s and flow then proceeds to step 84. If, on the other hand, condition A7 in step 70 is not True, flow simply proceeds directly to step 84.

At step 84 condition A8 is first checked. This condition entails determining if the reference signal x(n) has been active in the past 40 milliseconds. Additionally, condition A8 requires that the short term peak power of the reference signal p_xpmax1 be greater than a target TGT less a specified amount or that the reference signal power P_x be greater than the target TGT less the specified value. The target amount TGT is preferably set to −18 dBmO and the specified value set at −2 dB. Additionally at step 84, the converse of condition A2 is also checked to determine if it is True. This condition was described previously with respect to step 70. If the conditions of step 84 are True, flow proceeds to reference letter A, which, in turn, proceeds to step 88 shown in FIG. 5. If the conditions of step 84 are False, flow proceeds to reference letter B, which, in turn, proceeds to step 86 illustrated in FIG. 5. At step 88 in FIG. 5, the gain computed for the reference signal x(n) is set equal to the target value TGT divided by the intermediate variable tracking short term peak power of the reference signal p_xpmax. Flow then proceeds to step 90 to check condition A9.

Condition A9 in step 70 consists of determining whether the reference signal power P_x is greater than the short term peak power of the reference signal p_xpmax1. If this condition is true, flow proceeds to step 92 where the intermediate variable p_xpmax that tracks short term peak power of the reference signal is set equal to the present power of the reference signal p_x. Flow then proceeds to step 86. If condition A9 is not met at step 90, flow proceeds directly to step 86.

At step 86, the algorithm determines whether Mode 1 or Mode 2 is in the ON state. In addition, the conditions of step 86 require that the reference signal peak counter x_peak_cnt is equal to zero, which indicates that the reference signal has not been active for the past 40 milliseconds, or that condition A3 is True. For an explanation of condition A3 see the discussion of previous step 44 in relation to FIG. 3. If the conditions of step 86 are True, flow proceeds to step 94 where the gain computed for the reference signal in_gain is set equal to a value of 1. Flow then proceeds to step 76, which returns to the call step 36 in FIG. 3. Alternatively, if the conditions of step 86 are not met flow simply proceeds to the return step 76.

The above-described system and method for performing automatic gain control achieve amelioration of power disparity between the reference and desired signals as seen internally by the echo canceller unit.

What is claimed is:

1. A method of controlling echo cancellation gain within a communication system, the method comprising:

determining a reference signal power, a desired signal power and an error signal power;

determining an peak adaptive filter coefficient;

determining an echo canceller input gain adjustment value, an echo canceller output gain adjustment value, a desired signal gain adjustment value and a reference signal gain adjustment value based at least in part upon the reference signal power, the desired signal power; the error signal power and the peak adaptive filter coefficient;

in a first mode of operation, based upon an evaluation of the reference signal power, the desired signal power and the error signal power relative to a set of conditions, adjusting an echo canceller input gain based upon the echo canceller input gain adjustment value and adjusting an echo canceller output gain based upon the echo canceller output gain adjustment value while leaving a desired signal gain and a reference signal gain unchanged;

in a second mode of operation, based upon an evaluation of the reference signal power, the desired signal power and the error signal power relative to the set of conditions, adjusting an echo canceller input gain based upon the echo canceller input gain adjustment value, adjusting an echo canceller output gain based upon the echo canceller output gain adjustment value, adjusting the desired signal gain based upon the desired signal gain adjustment value and adjusting the reference signal gain based upon the reference signal gain adjustment value; and in a third mode of operation, based upon an evaluation of the reference signal power, the desired signal power and the error signal power relative to the set of conditions, adjusting the desired signal gain based upon the desired signal gain adjustment value and adjusting the reference signal gain based upon the reference signal gain adjustment value while leaving the echo canceller input gain and the echo canceller output gain unchanged.

2. The method of claim 1, wherein the set of conditions comprises: at least one of the desired signal has been active for a predetermined time period; a maximum power of the desired signal exceeds a first predetermined value and a power level of the desired signal is greater than a second predetermined value.

3. The method of claim 1, wherein the set of conditions comprises: at least one of the reference signal has been active for a predetermined time period; a maximum power of the reference signal exceeds a first predetermined value and a power level of the reference signal is greater than a second predetermined value.

4. The method of claim 1, comprising adjusting an echo canceller double-talk threshold value based upon the echo canceller input gain and the echo canceller output gain.

5. The method of claim 4, wherein adjusting an echo canceller double-talk threshold value comprises adjusting the echo canceller double-talk threshold value based upon the desired signal gain adjustment value.

6. The method of claim 4, wherein adjusting an echo canceller double-talk threshold value comprises adjusting the echo canceller double-talk threshold value based upon the desired signal gain and the reference signal gain.

7. An apparatus for controlling echo cancellation gain within a communication system comprising:

an echo canceller having an echo canceling logic that is configured to compute an echo canceller input gain adjustment value, an echo canceller output gain adjustment value, a desired signal gain adjustment value and a reference signal gain adjustment value based at least in part upon a reference signal power, a desired signal power; an error signal power and a peak adaptive filter coefficient;

the echo canceling logic operable for:

in a first mode of operation, based upon an evaluation of the reference signal power, the desired signal power and the error signal power relative to the set of conditions, adjusting an echo canceller input gain based upon the echo canceller input gain adjustment value and adjusting an echo canceller output gain based upon the echo canceller output gain adjustment value while leaving a desired signal gain and a reference signal gain unchanged;

in a second mode of operation, based upon an evaluation of the reference signal power, the desired signal power and the error signal power relative to the set of conditions, adjusting an echo canceller input gain based upon the echo canceller input gain adjustment value, adjusting an echo canceller output gain based upon the echo canceller output gain adjustment value, adjusting the desired signal gain based upon the desired signal gain adjustment value and adjusting the reference signal gain based upon the reference signal gain adjustment value; and in a third mode of operation, based upon an evaluation of the reference signal power, the desired signal power and the error signal power relative to the set of conditions, adjusting the desired signal gain based upon the desired signal gain adjustment value and adjusting the reference signal gain based upon the reference signal gain adjustment value while leaving the echo canceller input gain and the echo canceller output gain unchanged.

8. The apparatus of claim 7, wherein the set of conditions comprises: at least one of the desired signal has been active for a predetermined time period; a maximum power of the desired signal exceeds a first predetermined value and a power level of the desired signal is greater than a second predetermined value.

9. The apparatus of claim 7, wherein the set of conditions comprises: at least one of the reference signal has been active for a predetermined time period; a maximum power of the reference signal exceeds a first predetermined value and a power level of the reference signal is greater than a second predetermined value.

10. The apparatus of claim 7, wherein the echo canceller logic is operable for adjusting an echo canceller double-talk threshold value based upon the echo canceller input gain and the echo canceller output gain.

11. The apparatus of claim 10, wherein the echo canceller double-talk threshold value is based upon the desired signal gain adjustment value.

12. The apparatus of claim 10, wherein the echo canceller double-talk threshold value is based upon the desired signal gain and the reference signal gain.

* * * * *